(12) United States Patent
Takenaka et al.

(10) Patent No.: US 8,696,045 B2
(45) Date of Patent: Apr. 15, 2014

(54) ON-BOARD TOOL STORAGE STRUCTURE

(75) Inventors: Sho Takenaka, Hamamatsu (JP); Shuta Sasayama, Hamamatsu (JP)

(73) Assignee: Suzuki Motor Corporation (JP)

( * ) Notice: Subject to any disclaimer, the term of this patent is extended or adjusted under 35 U.S.C. 154(b) by 403 days.

(21) Appl. No.: 12/958,792

(22) Filed: Dec. 2, 2010

(65) Prior Publication Data

US 2011/0133504 A1 Jun. 9, 2011

(30) Foreign Application Priority Data

Dec. 4, 2009 (JP) ................... 2009-276149

(51) Int. Cl.
*B62D 43/00* (2006.01)
(52) U.S. Cl.
USPC ........................................ 296/37.2
(58) Field of Classification Search
USPC ............ 296/37.2, 187.11, 37.1, 37.16, 37.3; 211/70.6; 81/490; 414/463, 466; 70/259; 206/373; 224/402, 42.12, 224/42.13, 42.2, 42.21, 42.23, 42.24
See application file for complete search history.

(56) References Cited

U.S. PATENT DOCUMENTS

| | | | | |
|---|---|---|---|---|
| 3,175,742 A | * | 3/1965 | Cadmus | 224/42.23 |
| 3,187,914 A | * | 6/1965 | Peras | 414/463 |
| 3,831,793 A | * | 8/1974 | Eller | 414/466 |
| 4,384,815 A | * | 5/1983 | Suzuki et al. | 414/466 |
| 5,419,609 A | * | 5/1995 | Kmiec et al. | 296/187.11 |
| 5,860,687 A | * | 1/1999 | Corporon et al. | 296/37.2 |
| 6,155,625 A | * | 12/2000 | Felix | 296/37.14 |
| 6,467,829 B2 | * | 10/2002 | Kaluszka et al. | 296/37.3 |

(Continued)

FOREIGN PATENT DOCUMENTS

| | | |
|---|---|---|
| DE | 3140321 A1 | 4/1983 |
| JP | 01-029153 Y | 9/1989 |

(Continued)

OTHER PUBLICATIONS

German Office Action for Application No. 102010052749.1 dated Feb. 14, 2013 (English translation of excerpts.).

*Primary Examiner* — Kiran B Patel
(74) *Attorney, Agent, or Firm* — Lerner, David, Littenberg, Krumholz & Mentlik, LLP

(57) ABSTRACT

An object of the present invention is to provide a convenient on-board tool storage structure, the storage structure allowing a storage location of an on-board tool to be seen easily, and allowing the on-board tool to be taken out without detaching a spare tire. The on-board tool storage structure of the present invention is formed in a supporting member 110 having a mounting surface 112 on which a spare tire 106 is mounted with such an inclination that a vehicle rear side thereof is elevated. A storage groove 114 which stores the tool therein is formed in the supporting member. A vehicle rear side end portion of the storage groove is exposed at a vehicle rear side of the spare tire. A distance along the storage groove between a position in which the storage groove starts to be exposed and a back panel 104 is shorter than the total length of the tool. A deep groove portion 114a is formed at a lower portion of the storage groove in such a manner as to be deeper toward the rear of the vehicle. The tool is configured to be taken out from the storage groove without interference with the back panel by rotating the entire tool while sliding a vehicle front side end portion of the tool along a bottom portion of the deep groove portion of the storage groove.

2 Claims, 6 Drawing Sheets

(56) References Cited

U.S. PATENT DOCUMENTS

| | | | |
|---|---|---|---|
| 6,655,896 B2 * | 12/2003 | Morin et al. | 414/463 |
| 6,739,641 B2 * | 5/2004 | McLeod et al. | 296/37.2 |
| 7,195,298 B2 * | 3/2007 | Muthigi et al. | 296/37.2 |
| 7,226,104 B2 * | 6/2007 | Valencia et al. | 296/37.2 |
| 7,429,076 B2 * | 9/2008 | Asahi et al. | 296/203.04 |
| 7,540,559 B2 * | 6/2009 | Egawa et al. | 296/203.04 |
| 7,954,679 B2 * | 6/2011 | Edwards | 224/42.21 |
| 8,007,031 B2 * | 8/2011 | Yasuhara et al. | 296/187.11 |
| 2010/0314422 A1 * | 12/2010 | Yamada et al. | 224/42.2 |

FOREIGN PATENT DOCUMENTS

| | | |
|---|---|---|
| JP | 2000085485 A | 3/2000 |
| JP | 2005-112055 A | 4/2005 |
| JP | 4239777 B2 | 3/2009 |

* cited by examiner

CROSS SECTION A-A

CROSS SECTION C-C

CROSS SECTION B-B

ON-BOARD TOOL STORAGE STRUCTURE

CROSS-REFERENCE TO RELATED APPLICATIONS

This application claims the benefit of the filing date of Japanese Patent Application No. 2009-276149 filed Dec. 4, 2009, the entire disclosure of which is hereby incorporated herein by reference.

FIELD OF THE INVENTION

The present invention related to an on-board tool storage structure for storing a tool to be provided in a vehicle.

BACKGROUND OF THE INVENTION

A tool for maintenance is provided in a vehicle (hereinafter, referred to as "on-board tool") so that an occupant of the vehicle can deal with problems with the vehicle. As an on-board tool storage structure, Japanese Examined Utility Model Application Publication No. 1-29153 (hereinafter, Patent Document 1), for example, discloses a spare tire house (spare tire well) in which a first depressed portion for storing a spare tire has a second depressed portion further formed therein, and a groove is formed in a bottom surface of the first depressed portion in such a manner as to cross over the second depressed portion. Patent Document 1 states that the structure makes it possible to effectively use the space of the spare tire house while securely holding a spare tire.

In addition, Japanese Patent No. 4239777 (hereinafter, Patent Document 2) discloses a vehicle rear structure including a plate member, which covers a recessed space formed in a floor panel, and allows a spare tire to be mounted on an upper surface of the plate member, and an attachment member, which protrudes upwardly from a bottom surface of the recessed space, and can hold the spare tire. In the vehicle rear structure, a storage part for a small object is formed in a filling member composing the plate member. Patent Document 2 states that the structure makes it possible to preferably mount a spare tire in a vehicle and to effectively store a small object.

As described above, in Patent Document 1, a spare tire is mounted in a spare tire well. In Patent Document 2, a spare tire is mounted on a plate member in which a small object, such as an on-board tool, has been stored. Therefore, on-board tools and the like are covered by a spare tire, thereby reducing the visibility, resulting in it being difficult to see where the on-board tools are stored. Furthermore, when a spare tire is mounted above an on-board tool and the like as in the above-described structure, it is necessary to detach the spare tire in order to take out the on-board tool and the like, thereby forcing an occupant to perform complicated operation.

SUMMARY OF THE INVENTION

In view of these problems, an object of the present invention is to provide an on-board tool storage structure, the storage structure allowing a storage location of an on-board tool to be seen easily, and allowing the on-board tool to be taken out without detaching a spare tire, thereby being capable of improving convenience.

To solve the above problems, a typical configuration of the present invention is an on-board tool storage structure including a supporting member having a mounting surface on which a spare tire is mounted with such an inclination that a vehicle rear side thereof is elevated. The supporting member is arranged forward of a back panel at a rear portion of a vehicle compartment. The on-board tool storage structure stores an elongated tool near the mounting surface of the supporting member. A storage groove which is a narrow long groove and stores the tool therein is formed in the mounting surface of the supporting member. A vehicle rear side end portion of the storage groove is exposed at a vehicle rear side of the spare tire mounted on the mounting surface. A vehicle front side end portion of the storage groove is covered with the spare tire mounted on the mounting surface. A distance along the storage groove between a position in which the storage groove starts to be exposed and the back panel is shorter than the total length of the tool. A deep groove portion is formed at a lower portion of the storage groove in such a manner as to be deeper toward the rear of the vehicle. The tool is configured to be taken out from the storage groove without interference with the back panel by rotating the entire tool while sliding a vehicle front side end portion of the tool along a bottom portion of the deep groove portion of the storage groove.

In the above configuration, the vehicle rear side end portion of the storage groove is exposed at the vehicle rear side of the spare tire mounted on the mounting surface. This makes it possible to see an end of a tool stored in the storage groove. Accordingly, an occupant can easily know where the on-board tool is stored. Furthermore, the vehicle front side end portion of the storage groove is covered with the spare tire mounted on the mounting surface; therefore, a space underneath the spare tire mounted inclined can be used as a storage space. In addition, vertical shift of a tool stored in the storage groove can be prevented by the spare tire. This prevents a tool from flying out from the storage groove while the vehicle is running, thereby making it possible to reliably store the tool.

Furthermore, with the deep groove portion formed at the lower portion of the storage groove, even when the distance from a point in which the storage groove starts to be exposed to the back panel is shorter than the total length of a tool, that is, even when the gap between the tool and the back panel is significantly narrow, it is still possible to take out the tool without interference with the back panel. Specifically, the entire tool is rotated by upwardly lifting an exposed, thereby visible, end of the tool while causing the other end of the tool covered with the spare tire to slide along a bottom portion of the deep groove portion of the storage groove; thereby, the tool is pulled out. This allows the tool to be taken out from the storage groove without interference with the back panel, while the spare tire is mounted on the mounting surface. Thus, an occupant can take out a tool without performing complicated operation of detaching a spare tire; therefore, the convenience is increased.

In the present invention, the spare tire is mounted at the rear portion of the vehicle with such an incline that the vehicle rear side thereof is elevated. If a spare tire is mounted to lay flat, the spare tire would shift toward the front side of the vehicle due to a load applied to the tire from the back thereof, while remaining laying flat, resulting in the spare tire coming in contact with a front structure, such as a rear seat. On the other hand, if a spare tire has an inclination as in the present invention, the spare tire would be rotated due to a load applied thereto from the rear thereof, thereby coming to an upright state. Therefore, it is possible to prevent a front end portion of the spare tire from coming into contact with the front structure, such as a rear seat, and to reduce a load transmitted by such contact. With such a purpose of reducing a load, the present invention pioneers a way to use a space created under the inclined spare tire for storage.

The deep groove portion has a substantially triangular shape in cross section. This allows an elongated tool to be preferably stored at an oblique-side part in the cross-sectional surface of the substantially triangular shape while securing a space sufficient for the tool to be rotated to be taken out.

Any portion of the tool between the vehicle front side end portion thereof and a center thereof preferably comes into contact with the spare tire when the tool is taken out from the storage groove.

As in the above configuration, any portion of the tool between the vehicle front side end portion thereof and the center thereof comes into contact with the spare tire when the tool is taken out from the storage groove. In other words, the storage groove has such a shape that the tool barely comes into contact with the back panel when the tool is being taken out from the storage groove. Accordingly, the storage groove is formed to have a minimum depth needed; therefore, the space can be effectively used. Furthermore, having any portion of the tool between the vehicle front side end portion thereof and the center thereof coming in contact with the spare tire means that the other portion can be taken out without coming in contact with the spare tire. Therefore, the tool can be taken out without most of it coming into contact with the spare tire, thereby allowing a tool to be taken out easily.

The supporting member preferably has multiple storage grooves arranged in parallel to each other in a vehicle width direction of the vehicle. According to such a configuration, it is possible to store multiple on-board tools in the supporting member, thereby being able to further improve the convenience.

DETAILED DESCRIPTION OF THE INVENTION

Figure 1:
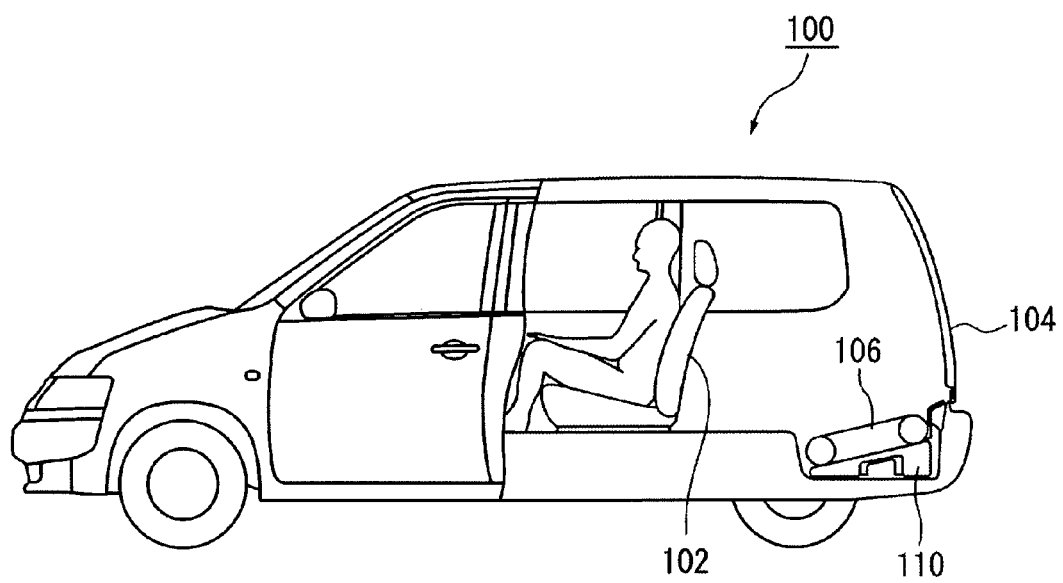
FIG. 1 is a general view of a vehicle equipped with a supporting member having an on-board tool storage structure according to each embodiment of the present invention.

Hereinafter, preferred embodiments of the present invention will be described in detail by referring to the attached drawings. Dimensions, materials, other specific numerical values and the like indicated in the embodiments are merely examples to facilitate understanding of the invention, and do not limit the present invention unless otherwise specifically noted. It should be noted that, in the present specification and drawings, elements which have substantially identical functions and configurations are denoted by the same reference numeral, thereby omitting repeating description. In addition, elements not directly related to the present invention is omitted from the drawings.

FIG. 1 is a general view of a vehicle equipped with a supporting member having an on-board tool storage structure according to each embodiment of the present invention. The on-board tool storage structure is a structure regarding a supporting member 110 for storing an elongated tool, the supporting member 110 being equipped in a vehicle 100. As shown in FIG. 1, the supporting member 110 having the on-board tool storage structure is provided in the vehicle 100 rearward of a rear seat 102 and forward of a back panel 104 located at a rear portion of a vehicle compartment, and supports a spare tire 106 mounted thereon.

First Embodiment

Figure 2A:
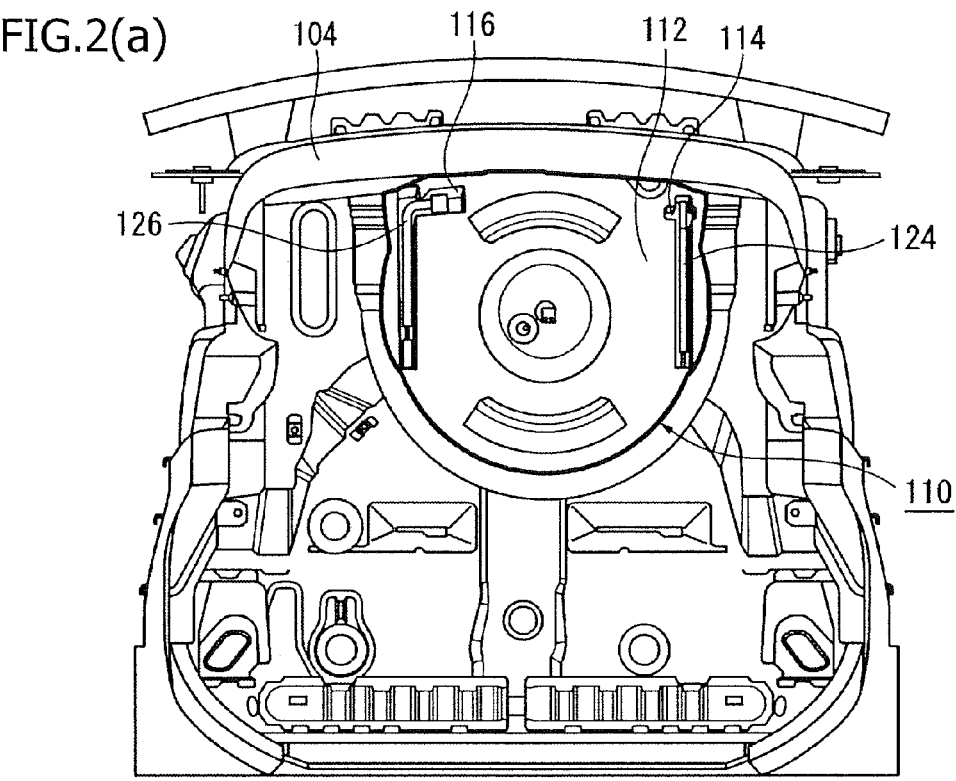
FIGS. 2A and 2B are views showing a schematic structure of an on-board tool storage structure according to a first embodiment.
Figure 2B:
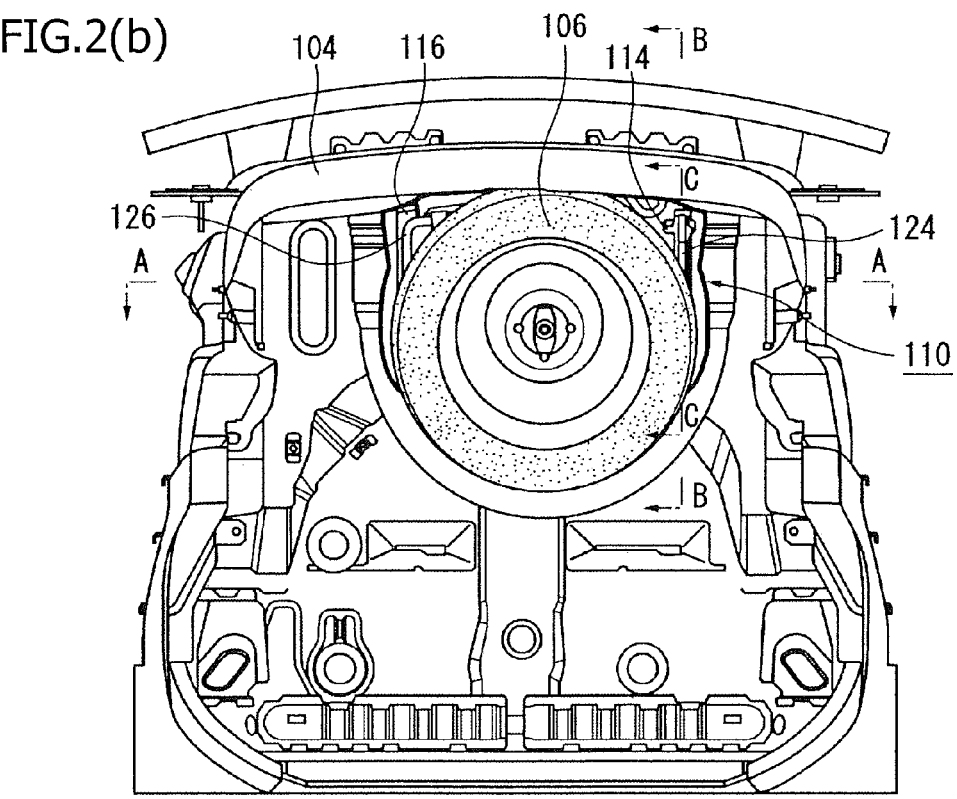

FIGS. 2A and 2B are views showing a schematic configuration of an on-board tool storage structure according to a first embodiment. FIG. 2A is a top view of a supporting member 110. FIG. 2B is a top view of the supporting member 110 in FIG. 2A when a spare tire 106 is mounted thereon. As shown in FIG. 2A, the supporting member 110 includes a mounting surface 112 and storage grooves 114 and 116.

The mounting surface 112 is provided on an upper surface of the supporting member 110, and allows the spare tire 106 to be mounted thereon at such an inclination that a vehicle rear side portion of the spare tire 106 is elevated (refer to FIG. 1). In other words, the mounting surface 112 has an inclination in such a manner as to be elevated towards the vehicle rear side. According to such a configuration, the spare tire 106 mounted is rotated by a load applied thereto from the rear, thereby coming to an upright state. Accordingly, different from the case in which the spare tire 106 is mounted to lay flat, the spare tire 106 would not shift horizontally due to a load applied thereto from the rear. Therefore, it is possible to prevent the spare tire 106 from coming in contact with a front structure, such as a rear seat, thereby being able to reduce a load transmitted by such contact. Moreover, it is possible to effectively use a space created below the spare tire 106 with an inclination as described above for storing an on-board tool.

The storage grooves 114 and 116 are long narrow grooves formed in the mounting surface 112, and store an on-board tool (hereinafter, simply referred to as tool). With the storage grooves 114 and 116 formed into such a long narrow shape, it is possible to preferably store tools, especially elongated tools 124 and 126. The tool 124 has an end curved in the shape of a hook, whereas the tool 126 has an end bent in substantially the shape of the letter of L (specifically, a wheel wrench and a jack). In the present embodiment, the storage grooves 114 and 116 have shapes notched along the mounting surface 112 or in a depth direction so as to match the shapes of these tools 124 and 126 to be stored therein. This is for preventing the tools from moving and bumping against the vehicle body, thereby avoiding: noise, damaging the vehicle body, and the like. In addition, with multiple storage grooves arranged in parallel with each other in a vehicle width direction of the vehicle 100 as the storage grooves 114 and 116 of the present embodiment, multiple tools can be stored in the supporting member 110, thereby being able to further improve the convenience.

As shown in FIG. 2B, vehicle rear side end portions of the storage grooves 114 and 116, respectively, are exposed at a vehicle rear side of the spare tire 106 mounted on the mounting surface 112. In such a configuration, one ends of the tools 124 and 126 stored in the storage grooves 114 and 116, respectively, are visible even if the spare tire 106 is mounted on the mounting surface 112. Accordingly, it is possible for an occupant to easily know where the tools 124 and 126 are stored, thereby being able to improve the convenience.

Figure 3:
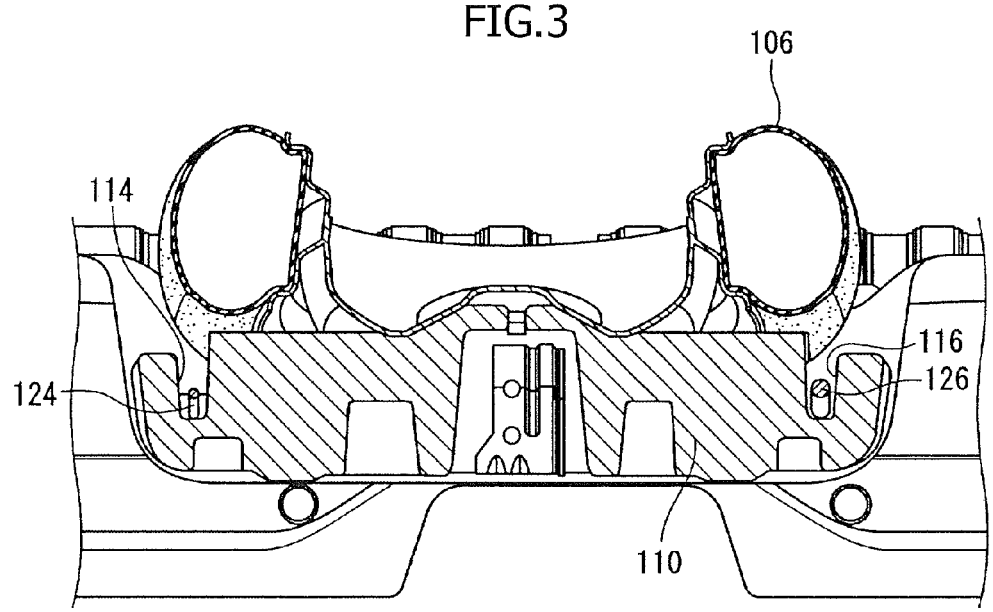
FIG. 3 is an A-A cross-sectional view of FIG. 2B.

FIG. 3 is an A-A cross-sectional view of FIG. 2B. When the spare tire 106 is mounted on the mounting surface 112, vehicle front side end portions of the storage grooves 114 and 116 are covered with the spare tire 106 (refer to FIG. 2B). This prevents vertical movement of the tools 124 and 126 stored in the storage grooves 114 and 116, respectively, as shown in FIG. 3. Accordingly, it is possible to prevent the tools 124 and 126 from flying out from the storage grooves 114 and 116, respectively, while the vehicle is running, thereby securely storing the tools 124 and 126.

Figure 4:
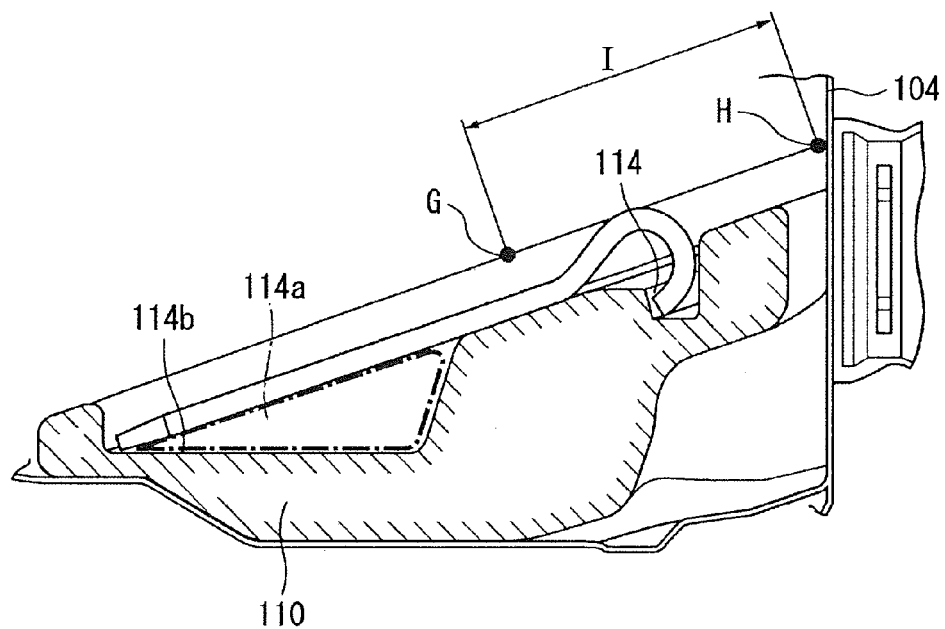
FIG. 4 is a C-C cross-sectional view of FIG. 2B.

FIG. 4 is a C-C cross-sectional view of FIG. 2B. As shown in FIG. 4, a deep groove portion 114a is formed at a lower portion of the storage groove 114 in such a manner as to become deeper towards the rear of the vehicle. According to such a configuration, it is possible to take out the tool 124 without interference with the back panel 104, even when the distance I along the storage groove 114 between a point in which the storage groove 114 starts to be exposed (a point G immediately under a point B described below) and a point H at the back panel 104 is shorter than the total length of the tool 124 (refer to FIG. 5A); that is, even when the gap between the tool 124 and the back panel 104 is significantly narrow thereby making it impossible to take out the tool 124 from the storage groove 114 in an orientation maintained as it is.

Especially, in the present embodiment, the deep groove portion 114a has a substantially triangular shape in cross section. This allows an elongated tool to be preferably stored in the storage groove 114 which is located at an oblique-side part of the substantially triangular shape while a sufficient space of the deep groove portion 114a is secured in which the tool is rotated as being taken out.

Figure 5A:
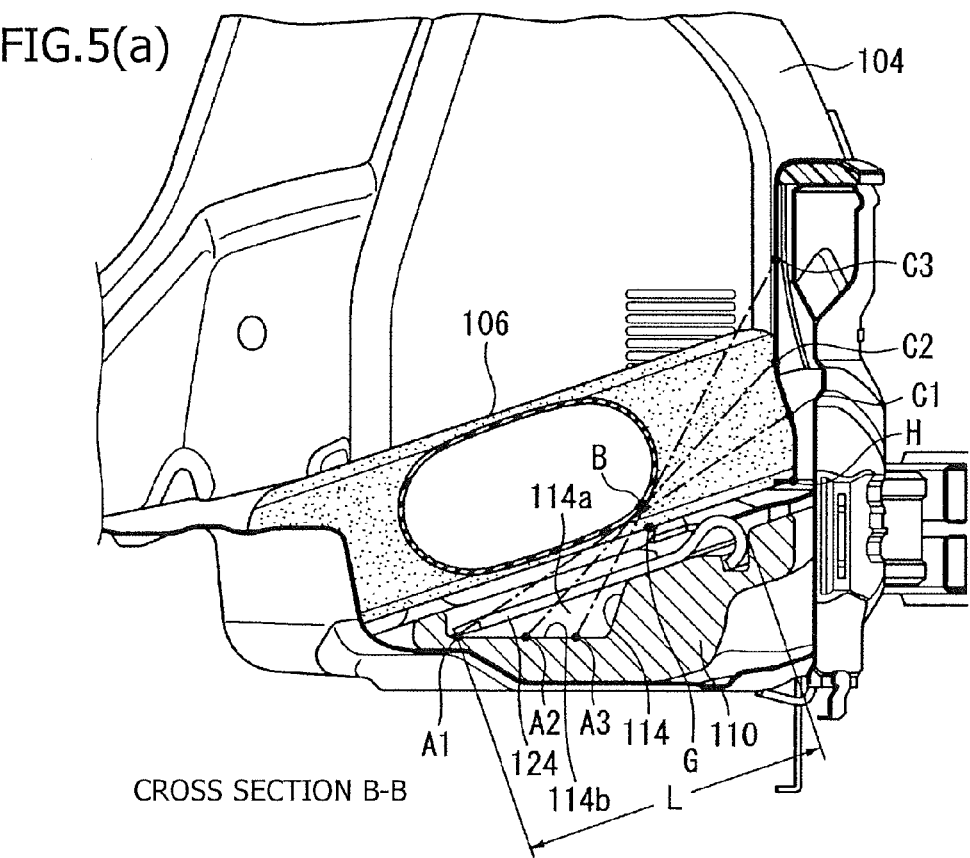
FIGS. 5A and 5B are B-B cross-sectional views of FIG. 2B.
Figure 5B:
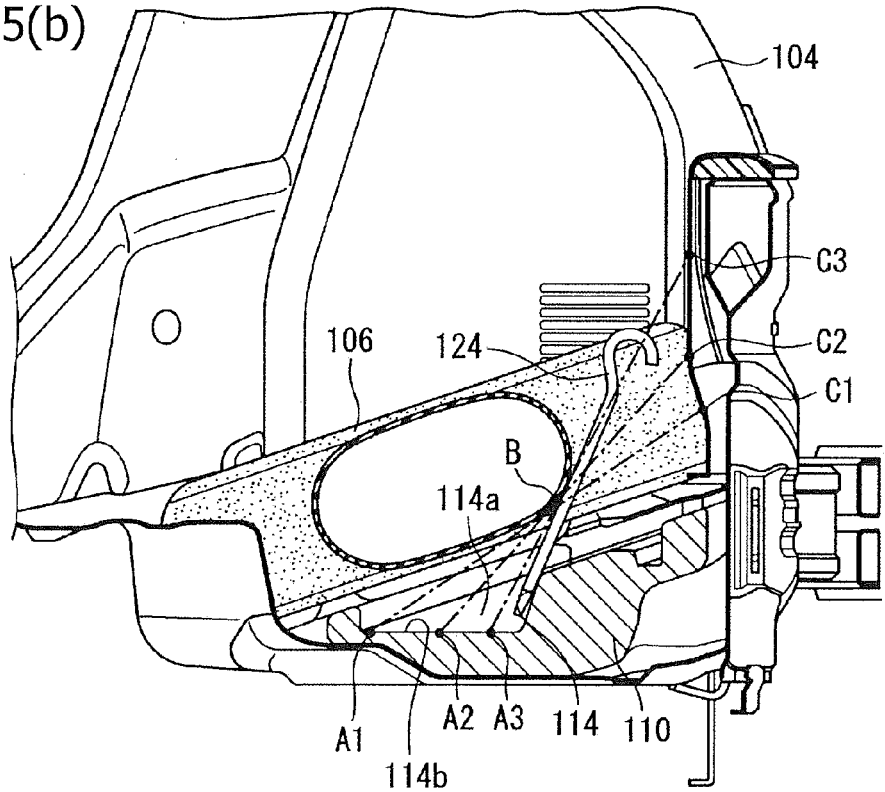

FIGS. 5A and 5B are B-B cross-sectional views of FIG. 2B. Hereinafter, in reference to FIG. 5, the shapes of the storage groove and the deep groove portion will be described in detail by taking the storage groove 114 as an example. As shown in FIG. 5A, the tool 124 to be stored in the storage groove 114 has a total length L. Here, a line segment A1C1 is defined by a line segment which starts from a point A1 on a bottom portion 114b of the deep groove portion 114a of the storage groove 114, goes through an end point B of an image of the storage groove 114 projected onto the spare tire 106 vertically upwardly (to the bottom portion 114b), and reaches the end at a point C1 on the back panel 104. A line segment A2C2 is defined by a line segment which starts from a point A2 on the bottom portion 114b of the deep groove portion 114a of the storage groove 114, goes through the end point B, and reaches the end at a point C2 on the back panel 104. A linear segment A3C3 is defined by a linear segment which starts from a point A3 on the bottom portion 114b of the deep groove portion 114a of the storage groove 114, goes through the end point B, and reaches the end at a point C3 on the back panel 104.

As is clearly shown in FIG. 5A, the distance along the storage groove 114 between a point in which the storage groove 114 starts to be exposed and the back panel 104 is shorter than the total length of the tool 124. Furthermore, the line segment A1C1, the line segment A2C2, and the line segment A3C3 each have a length equal to or longer than the total length L of the tool 124. It should be noted that, the starting point is not limited to A1, A2, and A3. Even in the case in which an arbitrary point on the bottom portion 114b of the storage groove 114 is designated to be a starting point, this condition holds.

When the tool 124 is to be taken out, the end of the tool 124 (vehicle rear side end portion) exposed from the storage groove 114 is lifted upwardly, while the other end of the tool 124 (vehicle front side end portion) covered with the spare tire 106 is pulled out along the bottom portion 114b of the deep groove portion 114a provided at the lower portion of the storage groove 114. In other words, the entire tool 124 is rotated (shifted) in such a manner as to move along the line segments in order of the line segment A1C1, the line segment A2C2, and the line segment A3C3 by causing the vehicle front side end portion of the tool 124 to slide along the bottom portion 114b of the deep groove portion 114a of the storage groove 114. At this time, in all the cases in which the tool 124 has an orientation matching the line segment A1C1, the line segment A2C2, and the line segment A3C3, there is a gap rearward of the tool 124 up to the back panel 104. This allows the tool 124 to be taken out from the storage groove 114 as shown in FIG. 5B.

Furthermore, formation of the deep groove portion 114a by digging deep down into the storage groove 114 as in the present embodiment makes it possible that the tip end of the tool 124 easily goes around to the vehicle rear side of the storage groove 114. Furthermore, since the bottom portion 114b of the storage groove 114 is substantially parallel to a floor surface of the space (also referred to as the spare tire housing) in which the supporting member 110 is provided, the tip end of the tool 124 can be smoothly moved in such a manner as to be in contact with the bottom portion 114b of the storage groove 114.

It should be noted that the upper apex of the deep groove portion 114a having a triangular shape preferably has a position in a vehicle length direction (horizontal direction) located in the vicinity of the end point B, more preferably located rearwardly in the vehicle from the endpoint B. This is because of the following reason. When the upper apex of the deep groove portion 114a having a triangular shape has a position in a horizontal direction located significantly forwardly in the vehicle of the end point B, the length in a vehicle length direction of the deep groove portion 114a is too short, resulting in the tool 124 being brought into contact with the spare tire 106 before being rotated so as to be able to be taken out; therefore, it is difficult to take out the tool 124.

As described above, it is possible for an occupant to take out the tool 124 without interference of the tool 124 with the back panel 104 while leaving the spare tire 106 mounted on the mounting surface 112, therefore improving the convenience. It should be noted that the storage groove 116 also has a shape satisfying the above-described conditions and the tool 126 stored therein can be taken out in the same procedure; therefore, a description is omitted.

Second Embodiment

Figure 6:
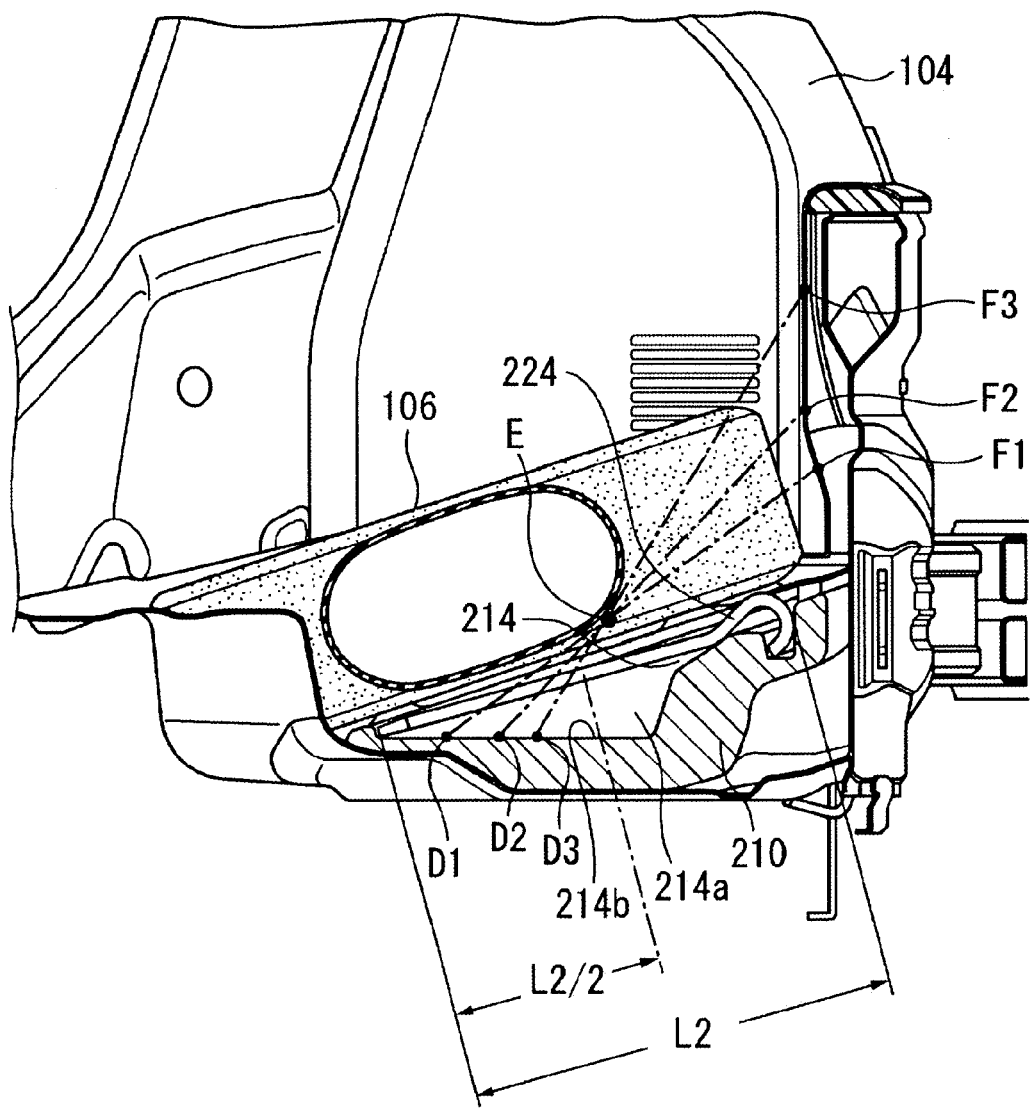
FIG. 6 is a view showing a schematic structure of an on-board tool storage structure according to a second embodiment.

FIG. 6 is a view showing a schematic configuration of an on-board tool storage structure according to a second embodiment. Note that, the same reference numeral is used for an element that is the same as that in the first embodiment, and description thereof is omitted. In the on-board tool storage structure of the second embodiment, a storage groove has a shape which allows any portion of a tool between a vehicle front side end portion thereof and a center thereof to come into contact with a spare tire when the tool is being taken out from the storage groove.

In detail, first of all, a tool 224 stored in a storage groove 214 has the total length of L2 as shown in FIG. 6. As is clearly shown in FIG. 6, in the second embodiment as well, the distance along the storage groove 214 from a point in which the storage groove 214 starts to be exposed to the back panel 104 is shorter than the total length of the tool 224. Moreover, a line segment D1F1 is defined by a line segment which starts from a point D1 on a bottom portion 214b of a deep groove portion 214a of the storage groove 214, goes through an end point E of an image of the storage groove 214 projected onto the spare tire 106 vertically upwardly, and reaches the end at a point F1 on the back panel 104. A line segment D2F2 is defined by a line segment which starts from a point D2 on the bottom portion 214b of the deep groove portion 214a of the storage groove 214, goes through the end point E of the image of the storage groove 214 projected onto the spare tire 106 vertically upwardly, and reaches the end at a point F2 on the back panel 104. A line segment D3F3 is defined by a line segment which starts from a point D3 on the bottom portion 214b of the deep groove portion 214a of the storage groove 214, goes through the end point E of the image of the storage groove 214 projected onto the spare tire 106 vertically upwardly, and reaches the end at a point F3 on the back panel 104.

Among the line segments D1F1, D2F2, and D3F3, the line segments D1F1 and D2F2 have a length equal to the total length L2 of the tool 224 stored in the storage groove 214. Meanwhile, the lengths of these line segments from the starting point to the end point of the image, that is, the lengths of line segments D1E and D2E are equal to or shorter than a half of the total length L2 (L2/2) of the tool 224. In such a configuration, any portion of the tool 224 between the center thereof and the vehicle front side end portion thereof (the end portion covered by the spare tire) inevitably comes into contact with the spare tire 106 when the tool 224 is taken out from the storage groove 214. This means that the storage groove 214 has such a shape that, upon being taken out from the storage groove 214, the tool 224 barely comes into contact with the back panel 104; therefore, the depth of the storage groove 214 is minimal necessary, thereby effectively using a space.

Furthermore, according to the above configuration, a portion of the tool 224 between the center thereof and the vehicle rear side end portion thereof do not come into contact with the spare tire 106. Accordingly, most of the tool 224 can be taken out from the storage groove 214 without coming into contact with the spare tire 106, thereby allowing the tool 224 to be taken out easily.

Another Embodiment

Figure 7A:
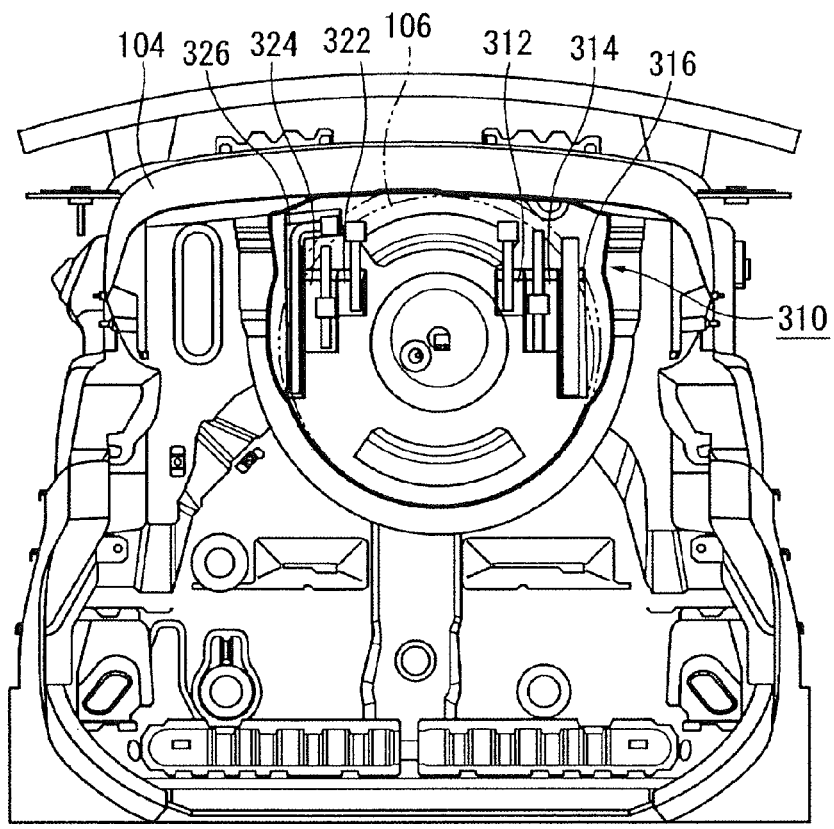
FIGS. 7A and 7B are views showing a schematic structure of an on-board tool storage structure of another embodiment.
Figure 7B:
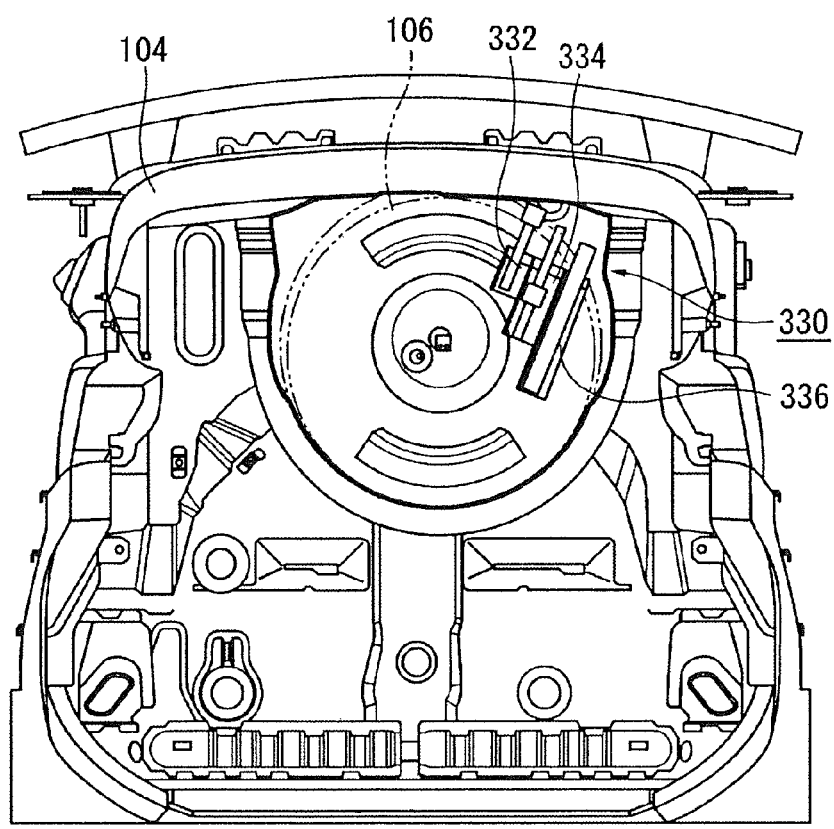

FIGS. 7A and 7B are views showing a schematic configuration of an on-board tool storage structure of another embodiment. Note that, the same reference numeral is used for an element that is the same as that in the first embodiment, and description thereof is omitted. In the supporting member 110 in the first embodiment, one storage groove is provided in each of the left and right portions of the supporting member 110. However, the position and number of storage grooves is not limited thereto.

For example, multiple storage grooves may be provided in each of left and right portions of a supporting member. Specifically, as in a supporting member 310 shown in FIG. 7A, multiple storage grooves 312, 314, and 316 may be provided in the right side of the supporting member 310. In addition, multiple storage grooves 322, 324, and 326 may be provided in the left side of the supporting member 310. According to such a configuration, it is possible to store a larger number of tools in a supporting member. In addition, storage grooves may not be necessarily formed parallel to a vehicle length direction. Specifically, as in a supporting member 330 shown in FIG. 7B, storage grooves 332, 334, and 336 may be formed in such a manner as to have an inclination toward a vehicle width direction from a vehicle length direction.

In the above, the preferred embodiments of the present invention have been described by referring to the attached drawings. However, it is apparent that the present invention is not limited to these examples. It is obvious that various modifications and alterations will be apparent to those skilled in the art, and it is understood that such examples are included in the technical scope of the present invention.

The present invention is applicable to an on-board tool storage structure which stores a tool to be provided in a vehicle.

What is claimed is:

1. An on-board tool storage structure comprising a supporting member having a mounting surface on which a spare tire is mounted with such an inclination that a vehicle rear side thereof is elevated, the supporting member being arranged forward of a back panel at a rear portion of a vehicle compartment, the on-board tool storage structure storing an elongated tool near the mounting surface of the supporting member, wherein a storage groove which is a narrow long groove and stores the tool therein is formed in the mounting surface of the supporting member, a vehicle rear side end portion of the storage groove is exposed at a vehicle rear side of the spare tire mounted on the mounting surface, a vehicle front side end portion of the storage groove is covered with the spare tire mounted on the mounting surface, a distance along the storage groove between a position in which the storage groove starts to be exposed and the back panel is shorter than the total length of the tool, a deep groove portion is formed at a lower portion of the storage groove in such a manner as to be deeper toward the rear of the vehicle, and the tool is configured to be taken out from the storage groove without interference with the back panel by rotating the entire tool while sliding a vehicle front side end portion of the tool along a bottom portion of the deep groove portion of the storage groove.

2. The on-board tool storage structure according to claim 1, wherein the deep groove portion has a substantially triangular shape in cross section.

* * * * *